(12) United States Patent
Wu et al.

(10) Patent No.: US 10,353,987 B2
(45) Date of Patent: Jul. 16, 2019

(54) IDENTIFICATION OF A BREAKPOINT BASED ON A CORRELATION MEASUREMENT

(71) Applicant: Hewlett-Packard Development Company, L.P., Houston, TX (US)

(72) Inventors: Shanchan Wu, Palo Alto, CA (US); Lei Liu, Palo Alto, CA (US); Jerry Liu, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/545,681

(22) PCT Filed: Jan. 30, 2015

(86) PCT No.: PCT/US2015/013659
§ 371 (c)(1),
(2) Date: Jul. 22, 2017

(87) PCT Pub. No.: WO2016/122556
PCT Pub. Date: Aug. 4, 2016

(65) Prior Publication Data
US 2018/0004710 A1 Jan. 4, 2018

(51) Int. Cl.
G06F 17/21 (2006.01)
G06Q 10/10 (2012.01)
G06F 17/22 (2006.01)
G06T 7/11 (2017.01)

(52) U.S. Cl.
CPC ........ G06F 17/211 (2013.01); G06F 17/2241 (2013.01); G06Q 10/10 (2013.01); G06T 7/11 (2017.01)

(58) Field of Classification Search
None
See application file for complete search history.

(56) References Cited

U.S. PATENT DOCUMENTS

| 8,245,133 | B2 | 8/2012 | Grigoriadis et al. |
| 9,087,043 | B2 | 7/2015 | Kandekar et al. |
| 9,378,299 | B1* | 6/2016 | Rashidi ............ G06F 17/30899 |
| 2003/0018663 | A1 | 1/2003 | Cornette et al. |
| 2004/0243388 | A1* | 12/2004 | Corman .............. G06F 17/2211 704/1 |

(Continued)

FOREIGN PATENT DOCUMENTS

WO  WO-2010-078475 A2  7/2010

OTHER PUBLICATIONS

Dalia Coppi et al., "Illustrations segmentation in digitized documents using local correlation features," Procedia Computer Science—10th Italian Research Conference on Digital Libraries (IRCDL 2014), vol. 38, pp. 76-83, Nov. 11, 2014, See pp. 78-80.

(Continued)

*Primary Examiner* — Stephen S Hong
*Assistant Examiner* — Sanchita Roy
(74) *Attorney, Agent, or Firm* — HP Inc. Patent Department

(57) ABSTRACT

Examples herein disclose obtaining regions of digital content and determining a correlation measurement between the multiple regions of digital content adjacently located to each other. The examples disclose identifying a breakpoint in the digital content based on the determined correlation measurement.

12 Claims, 7 Drawing Sheets

(56) References Cited

U.S. PATENT DOCUMENTS

2008/0243805 A1    10/2008    Gutta et al.
2008/0263032 A1    10/2008    Vailaya et al.
2016/0070692 A1*   3/2016    Kenthapadi ........... G06F 17/277
                                                                       704/9

OTHER PUBLICATIONS

Jing Chen et al, "Automatically Generating an E-textbook on the Web", Dec. 2005.
Kohonen, T, et al, "Self Organization of a Massive Document Collection", May 2000.
Marti Hearst, "TextTiling: Segmenting Text Into Multi-paragraph Subtopic Passages", Mar. 1, 1997.
Ramakrishnan et al., "Layout-aware text extraction from full-text PDF of scientific articles," Source Code for Biology and Medicine, vol. 7, Art. No. 1, pp. 1-10, May 28, 2012.
Chibane et al., "A Web Page Topic Segmentation Algorithm Based on Visual Criteria and Content Layout," In: Proceedings of the 30th annual international ACM SIGIR conference on Research and development in information retrieval (SIGIR '07), pp. 817-818, Jul. 23-27, 2007.
Hu et al., "Generating Breakpoint-based Timeline Overview for News Topic Retrospection," In: 2011 11th IEEE International Conference on Data Mining, pp. 260-269, Dec. 11-14, 2011.

* cited by examiner

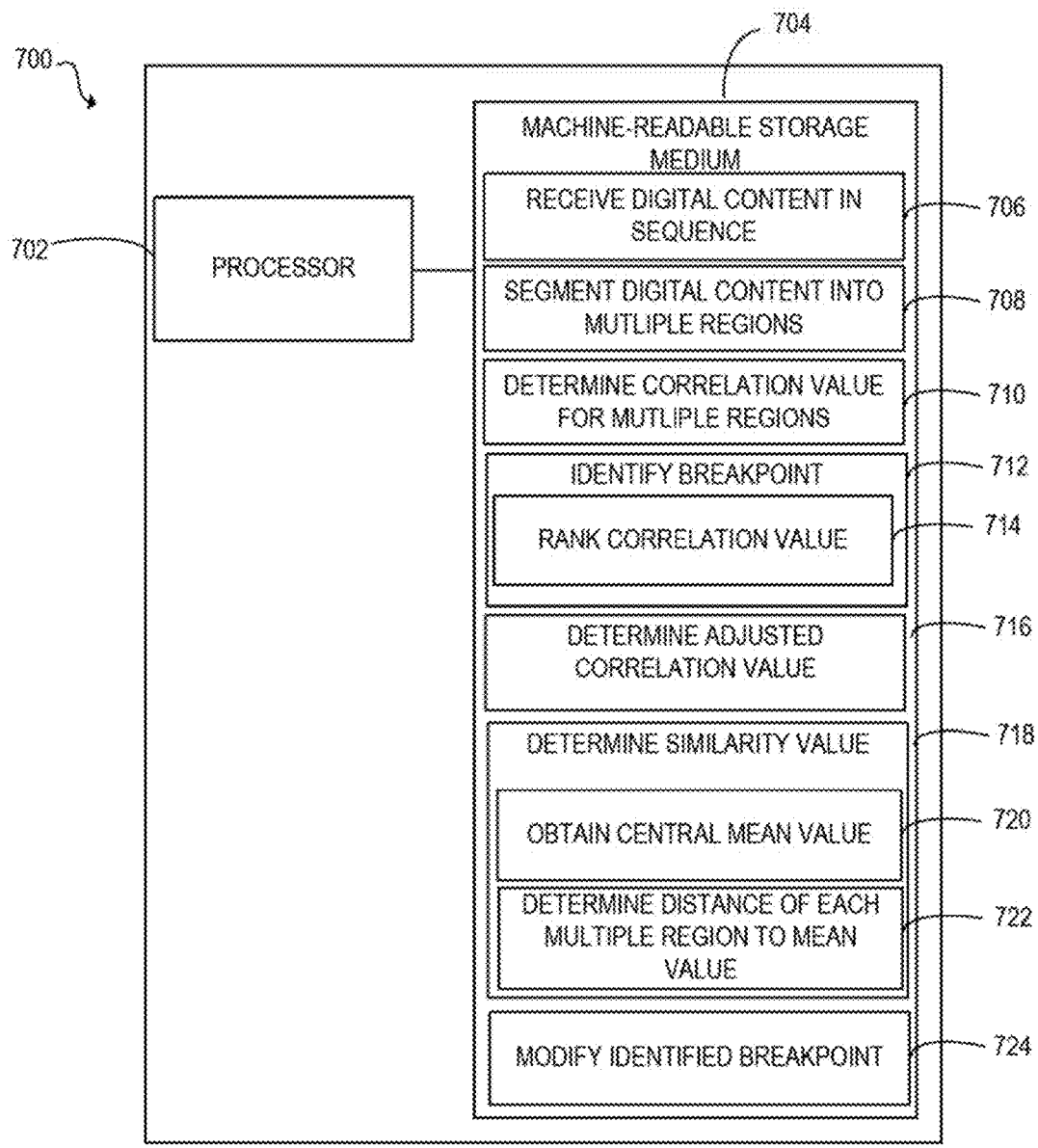

IDENTIFICATION OF A BREAKPOINT BASED ON A CORRELATION MEASUREMENT

BACKGROUND

Electronic publishing involves a digital publication of electronic books, digital magazines, and the development of digital libraries. These digital publications may be created by authors seeking to convey particular ideas. Additionally, these digital publications may be used as learning tools for a student to engage in the exchange of information and/or ideas.

BRIEF DESCRIPTION OF THE DRAWINGS

In the accompanying drawings, like numerals refer to like components or blocks. The following detailed description references the drawings, wherein:

FIG. 7 is a block diagram of an example computing device with a processor to execute instructions in a machine-readable storage medium for modifying an identified breakpoint based on a correlation value and a similarity value.

DETAILED DESCRIPTION

Figure 1:
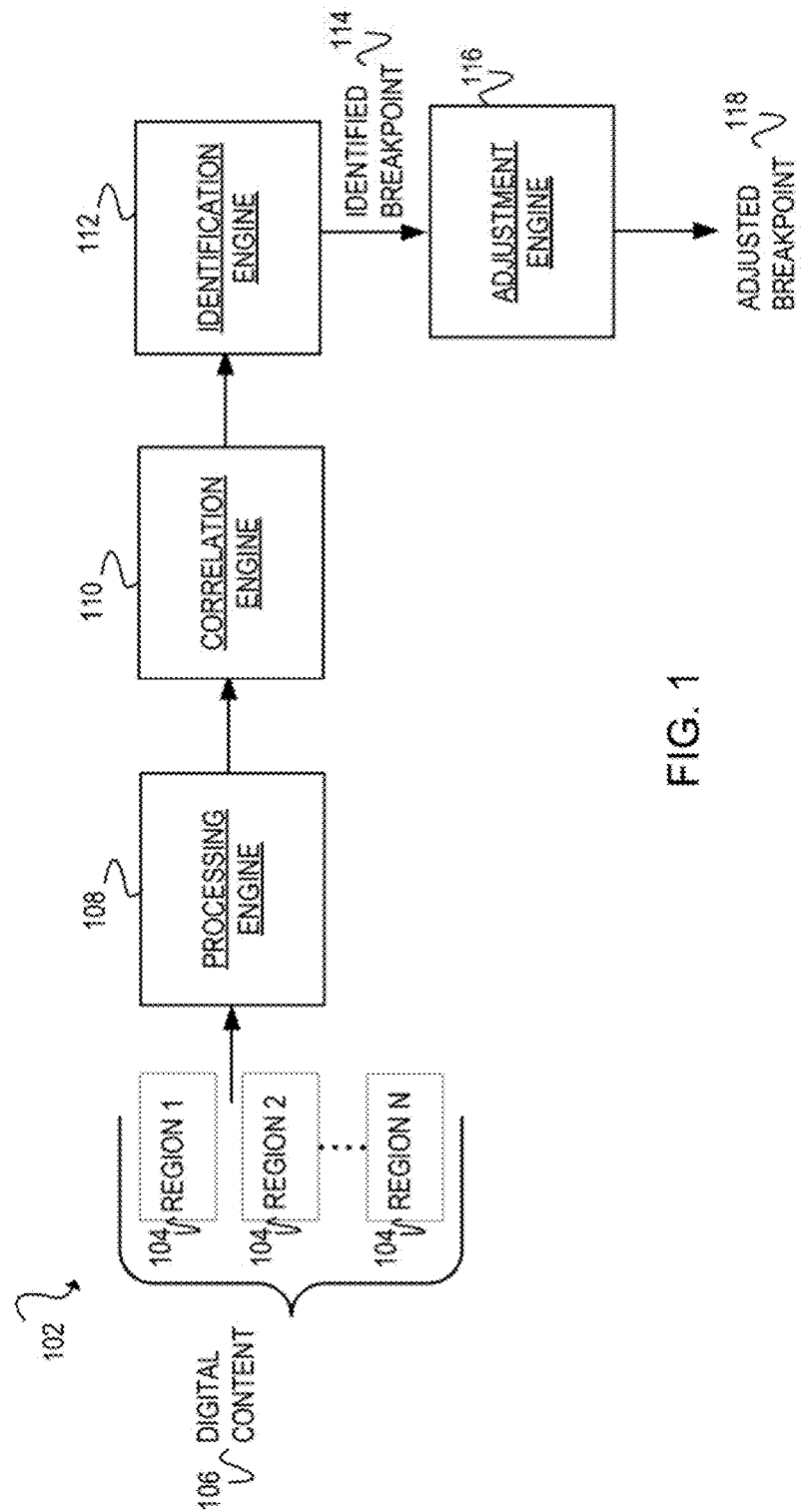
FIG. 1 is a block diagram of an example system to obtain multiple regions of digital content for identification of a breakpoint.

In digital publishing, an author or teacher may curate content to create an electronic book or other type of document. In this situation during the creation of the electronic book, the author may collect the material or content and organize this material in a sequence in which the author desires; however, the author may have difficulty deciding in how to segment this material or content in such a manner that a reader may logically follow and understand key points. For example, a creator of the content may have difficulty in determining at which points in the material to create stopping and starting points through chapters and/or sections. Additionally, the author may manually decide how to segment this material to create chapters in the electronic book, thus taking much time and effort. Manually segmenting the chapters may also providing difficulties in providing coherency to the reader to ensure understanding of the material. Although the term chapter is used throughout this document as a main division of content, implementations should not be limited as chapter may additionally represent a section or other type of division of the content. As such, the terms chapter and section may be used interchangeably throughout this document.

To address these issues, examples disclosed herein provide a mechanism for automating chapter identification from content and/or material collected by an author. The examples obtain multiple regions of digital content in a sequence as collected by the author. Using this sequence, the examples calculate a correlation value between those multiple regions of digital content which are located adjacent to each other as put forth by the sequence. Using this correlation value, the examples identify a breakpoint between the multiple regions of the digital content while maintaining the sequence of digital content collected by the author. The breakpoint provides an interruption between the multiple regions of digital content, thus creating a division in the digital content which automates the identification of chapters. Automating the identification of the chapters within the digital content provides a recommendation to the author how to segment the digital content in a book or document. Identifying how to segment the digital content saves much time and effort for the author.

Additionally identifying how to segment the digital content, the examples provide a more coherent segmentation for a reader to logically understand and comprehend the content. Further automating the segmentation of the digital content into chapters provides logical units of content which may be returned in a search query. This gives the content more context by returning the logical unit (e.g., chapter) most relevant to the search request rather than returning the full document which may overwhelm the requester.

Other examples discussed herein, calculates an adjusted correlation value based upon the identification of the breakpoint. The adjusted correlation value is calculated for those regions adjacent to the identified breakpoint. Based on this adjusted correlation value, each region of content may be accurately accessed to determine which chapter is more appropriate for including that region. For example, the adjusted correlation value may determine whether a particular region should be merged into an adjacent chapter. Merging the particular region provides an adjustment or modification to the identified breakpoint to ensure each chapter includes the most appropriate content. In this implementation, the content flow is adjusted or modified, thus modifying the breakpoint so the interruption in the content may occur earlier or later in the content flow.

Yet, other examples discussed herein determine a total amount of content within the digital content and a minimum amount of content which should be included in each chapter. Accordingly, if the proposed chapter based on the identified breakpoint is below the minimum amount of content, the proposed chapter may be merged or combined into an adjacent chapter. Merging the chapters avoids excessively small chapters, thus providing additional coherence of the reader.

Thus, examples disclosed herein automate chapter identification in a book under creation. The examples calculate a correlation value for those regions of content or material which are located adjacent to one another. Calculating the correlation value, the examples may identify breakpoints between those regions of content or material. Identifying the breakpoints, the examples create the divisional segmentation between the regions of content and/or material, thus creating the chapters within the digital content.

Referring now to the figures, FIG. 1 is a block diagram of an example system 102 including a processing engine 108 to obtain multiple regions 104 of digital content 106. The processing engine 108 processes the multiple regions 104 for a correlation engine 110. The correlation engine 110 determines a correlation value for those multiple regions 104 which are located adjacent to one another. Upon determining the correlation value, an identification engine 112 identifies a breakpoint 114 to insert between the multiple regions 104. Upon identifying the breakpoint 114, an adjusted engine 116 may determine an adjusted correlation value for each of the multiple regions 104 located adjacent to the identified breakpoint 114. Thus, depending on the adjusted correlation value, the adjusted engine 116 may produce an adjusted breakpoint 118. Although the system 102 depicts the engine components 108, 110, 112, and 116 as separate components from one another, this was done for illustration purposes as these engine components 108, 110, 112, and 116 may include a combination of such components 108, 110, 112, and 116.

The multiple regions 104 are those blocks of content which constitute the digital content 106. The digital content 106 is considered that content which may constitute a document or electronic book in which a user may wish to insert at least one breakpoint. The breakpoint provides an interruption between the multiple regions 104 in accordance with the calculated correlation value. As such, the breakpoint represents the interruption in which to divide the digital content 106 to create multiple chapters. The multiple regions 104 are subsections of the digital content 106 in which the breakpoint is inserted between these regions 104 to create the chapters within the digital content 106. As such, the multiple regions 104 may include by way of example, articles pages, paragraphs, sentences, etc. In one implementation, the user creates the multiple regions 104 of the digital content 106. In another implementation, the user creates a full document of the digital content 106. In this implementation, the system 102 obtains the digital content 106 and segments the content into the multiple regions 104.

The processing engine 108 obtains the multiple regions 104 for processing the content within each of the multiple regions 104. The processing engine 108 may include processing each of the multiple regions 104 for the removal of stop text and/or stemming text. Stop text are those words or text which are filtered out before and after processing of the content within the multiple regions 104. Examples of stop words may include but should not be limited to the, is, at, which, on, etc. Stemming text are those words which are reduced to the word's root form which may occur before and after processing the content within the multiple regions 104. The processing engine 108 may include, electronic circuitry (i.e., hardware) that implements the functionality of the processing engine 108. In this example, processing engine 108 may include by way of example, an integrated circuit, application integrated circuit (ASIC), controller, processor, semiconductor, processing resource, chipset, semiconductor, or other type of hardware component capable of the functionality of the processing engine 108. Alternatively, the processing engine 108 may include instructions (e.g., stored on a machine-readable medium) that, when executed by a hardware component (e.g., processor and/or controller), implement the functionality of the processing engine 108.

The correlation engine 110 calculates the correlation value for each pair of multiple regions 104 which are located adjacent to one another. For example, the pair of multiple regions 104 which are located adjacent to one another may include: Region 1 and Region 2; Region 2 and Region 3; Region N−1 and Region N, etc. The correlation value is a measurement of the related content and/or similar content between these pairs of adjacent regions 104. The correlation value may be calculated using various mechanisms including, by way of example, Pearson correlation, topic model, BM25, or other type of correlation metrics. The correlation value is explained in detail in later figures. The correlation engine 110 may be similar in functionality to the processing engine 108. As such, implementations of the correlation engine 110 may include electronic circuitry (i.e., hardware) that implements the functionality of the correlation engine 110. Alternatively, the correlation engine 110 may include instructions (e.g., stored on a machine-readable medium) that, when executed by the hardware component (e.g., processor and/or controller), implement the functionality of the correlation engine 110.

The identification engine 112 uses the correlation value produced by the correlation engine 110 to identify the breakpoint 114 between the multiple regions 104. In one implementation, the identification engine 112 determines which correlation values are the lower values among multiple correlation values. In this implementation, it is assumed that the correlation value for the pair for adjacent multiple regions 104 which belong in different chapters would be lower than the pair of adjacent multiple regions 104 which belong in the same chapter. The lower value indicates that the content located in that pair of adjacent multiple regions 104 are less related and/or less similar than other pairs of adjacent multiple regions 104 which have a higher calculated correlation value. In another implementation, if the correlation value is below a particular threshold, this may indicate to insert the breakpoint between those regions 104. The identification engine 112 may be similar in functionality to the processing engine 108. As such, implementations of the identification engine 112 may include electronic circuitry (i.e., hardware) that implements the functionality of the identification engine 112. Alternatively, the identification engine 112 may include instructions (e.g., stored on a machine-readable medium) that, when executed by the hardware component (e.g., processor and/or controller), implement the functionality of the identification engine 112.

The identified breakpoint 114 is an interruption between the multiple regions 104 that creates the chapters within the digital content 106. As such, the identified breakpoint 114 provides a stopping point from one chapter prior to an adjacent chapter. The identified breakpoint 114 is based on the calculated correlation value calculated at engine 110 which enables the system 102 to automate the identification of chapters within the digital content 106. In one implementation, the identified breakpoint 114 serves as an initial or proposed breakpoint. In this implementation, the adjustment engine 116 calculates the adjusted correlation value based on the location of each region 104 adjacent to the initial breakpoint. This adjusted correlation value enables the adjustment engine 116 to identify whether a particular region should be merged into an adjacent chapter or remain in the chapter in which it belongs. In this implementation, if the particular region is excluded and/or merged into one of the chapters, the adjustment engine 116 may further adjust the initial breakpoint.

The adjustment engine 116 calculates the adjusted correlation value based on the identified breakpoint 114. The adjusted correlation value is that value for the region 104 which is located adjacent to the identified breakpoint 114. The adjusted correlation value is discussed in detail in a later figure. The adjustment engine 116 may be similar in functionality to the processing engine 108. As such, implementations of the adjustment engine 116 may include electronic circuitry (i.e., hardware) that implements the functionality of the adjustment engine 116. Alternatively, the adjustment engine 116 may include instructions (e.g., stored on a machine-readable medium) that, when executed by the hardware component (e.g., processor and/or controller), implement the functionality of the adjustment engine 116.

The adjusted breakpoint 118 is a modification to the identified breakpoint 114 based on the adjusted correlation value as calculated by the adjustment engine 116. In one implementation, the adjustment engine 116 may determine a total length of the digital content 106 and a minimum amount of content which should be included in each chapter. Thus, considering each initial breakpoint, the adjustment engine 116 may determine if each chapter meets the minimum amount of content. If the chapter falls below the minimum amount of content, that chapter may be merged into an adjacent chapter, thus also adjusting the initial breakpoint to include the merged chapter. These implementations are discussed in details in a later figure.

Figure 2A:
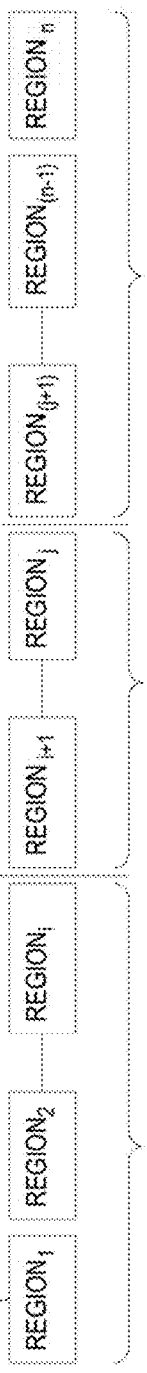
FIG. 2A is a block diagram of example breakpoints in which to divide digital content composed of multiple regions into multiple chapters.

FIG. 2A is a block diagram illustrating multiple breakpoints 206 in which to divide digital content composed of multiple regions 204 of content into multiple chapters 208. The multiple regions 204 between the breakpoints 206 compose each respective chapter 208. For example, the first chapter 208 (Chapter 1) includes regions of content 204 from $Region_1$ to $Region_{(i-1)}$.

As illustrated in FIG. 2A, to create at least three chapters 208 (Chapter 1, Chapter 2, and Chapter 3), two breakpoints 206 are identified for breaking up the multiple regions 204 of content. The breakpoints 206 are identified based on a correlation value between those pairs of multiple regions 204 which are located adjacently to one another. The correlation value is calculated to determine how related the content in each of the multiple regions 204 are to one another. This correlation value is calculated prior to identifying the various breakpoints 206. Rather, the correlation value is used to identify these breakpoints 206. For example the pairs of adjacent multiple regions 204 may include the following: $Region_1$ and $Region_2$; $Region_2$ and $Region_3$; $Region_i$ and $Region_{(i+1)}$; $Region_j$ and $Region_{(j+1)}$; and $Region_{(n-1)}$ and $Region_n$. The correlation value may be calculated using various mechanisms including, by way of example, Pearson correlation, topic model, BM25, or other type of correlation metrics. In another implementation, a sequence of the multiple regions 204 is determined based upon the order a user may input the digital content. In this implementation, the order the digital content is uploaded is the order or sequence of the multiple regions 204. In this implementation, the order of the multiple regions 204 is set according to the order in which the digital content is input.

Figure 2B:
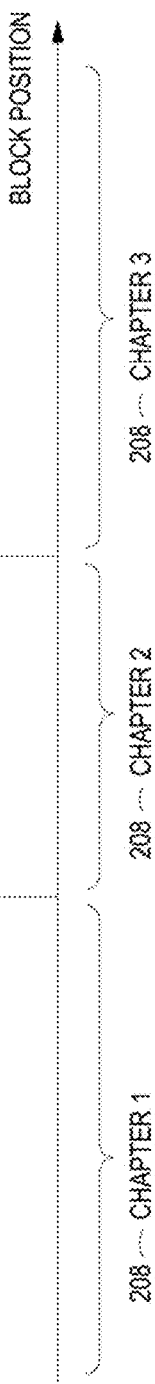
FIG. 2B is a graph illustrating an example identification of breakpoints according to a correlation value produced for multiple regions located adjacently to each other.

FIG. 2B is a graph illustrating an identification of multiple breakpoints 206 between multiple regions of digital content. The multiple breakpoints 206 are identified based on a correlation value 210. The correlation value 210 as observed on the x-axis of the graph, is a value which is produced based on relatedness of content between a pair of adjacent multiple regions. The chapters 208 are observed on the y-axis of the graph corresponding to the positions of the multiple regions 204.

As illustrated in FIG. 2B, it is assumed that the correlation value of a pair of adjacent multiple regions 204 which belong to different chapters 208 are lower than a pair of adjacent multiple regions 204 which belong in the same chapter 208. In one implementation, the breakpoints 206 are identified among those correlation values 210 which are lower values. For example, the first breakpoint 206 (Breakpoint 1), is a lower correlation value 210 between $Region_i$ and $Region_{(i+1)}$ than the correlation value corresponding to $Region_1$ and $Region_2$. The lower the correlation value 210 indicates the content within those regions are less related than other regions. In one implementation, these breakpoints 206 are considered the initial breakpoints in that the breakpoints 206 may be modified to include or exclude particular regions of content. In this implementation, an adjusted correlation value is calculated for each of the multiple regions 204 which are located adjacent to the initial breakpoints 206. Based on this adjusted correlation value, the initial breakpoints 206 may be adjusted to include or exclude the particular regions of content. This implementation is explained in detail later figures.

Figure 3A:
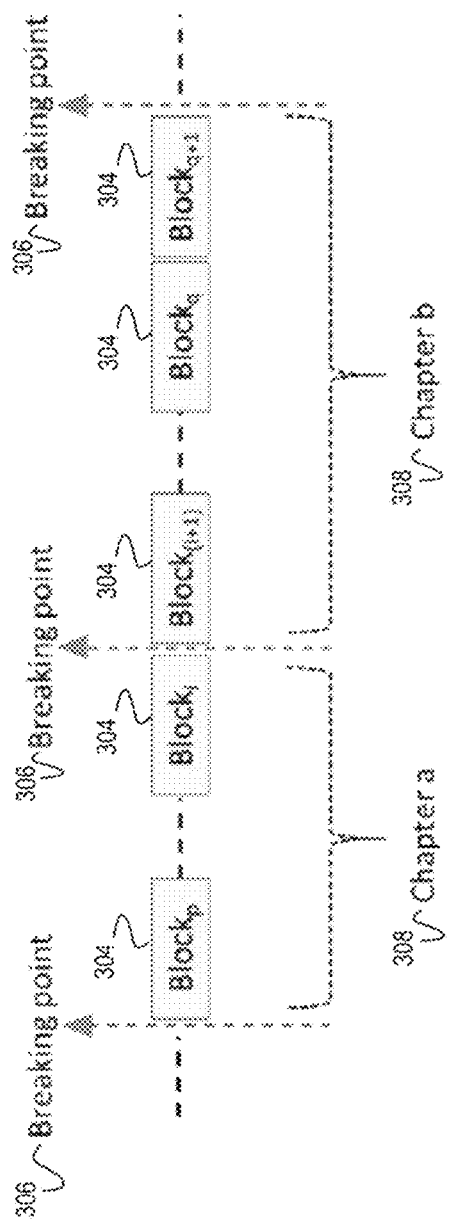
FIG. 3A is a diagram of example breakpoints illustrating chapters among multiple regions of digital content.

FIG. 3A is a diagram of example breakpoints 306 illustrating chapters 308 among multiple regions 304 of digital content. As illustrated in FIG. 3A, the first breakpoint 306 (Breakpoint 1) is located between a previous region of content and region 304 ($Region_P$). The second breakpoint 306 (Breakpoint 2) is located between the multiple regions 304 ($Region_i$) and ($Region_{(i+1)}$). The third breakpoint 306 (Breakpoint 3) is located between the region 304 ($Region_{(q+1)}$) and subsequent multiple regions. The multiple regions 304 between the first breakpoint 306 and the second breakpoint 306 make up the content included in the chapter 308 (Chapter A). The multiple regions 304 between the second breakpoint 306 and the third breakpoint 306 make up the content included in the chapter 308 (Chapter B).

Each of the breakpoints 306 were selected as the correlation value between the respective regions 304 were lower in value and thus indicates the content between those adjacent regions are not as related. The lower amount of the correlation value enables identification of those breakpoints 306 for the automation of the various chapters 308.

In other implementations, the correlation value may be adjusted based on each of the multiple regions 304 adjacent to each breakpoint 306. For example, these multiple regions adjacent to the breakpoints 306 may include $Region_P$, $Region_i$, $Region_{(i+1)}$, and $Region_{(q+1)}$. In a further example, consider the chapter 308 (Chapter A) which includes $Region_i$ and the adjacent chapter 308 (Chapter B) which includes $Region_{(i+1)}$. In this example, it would be expected that the content within the region 304 ($Region_i$) is more related to the content within the chapter 308 (Chapter A) than the adjacent or neighboring chapter 308 (Chapter B). It may be possible that the content within the region 304 (Region) is more related to the content in the adjacent chapter 308 (Chapter B) than the content in the chapter 308 (Chapter A) in which the region 304 ($Region_i$) is situated. In this situation, an adjusted correlation value is determined as in connection with FIG. 3B to verify which chapter 308 (Chapter A or Chapter B), the region 304 ($Region_i$) is more closely related.

Figure 3B:
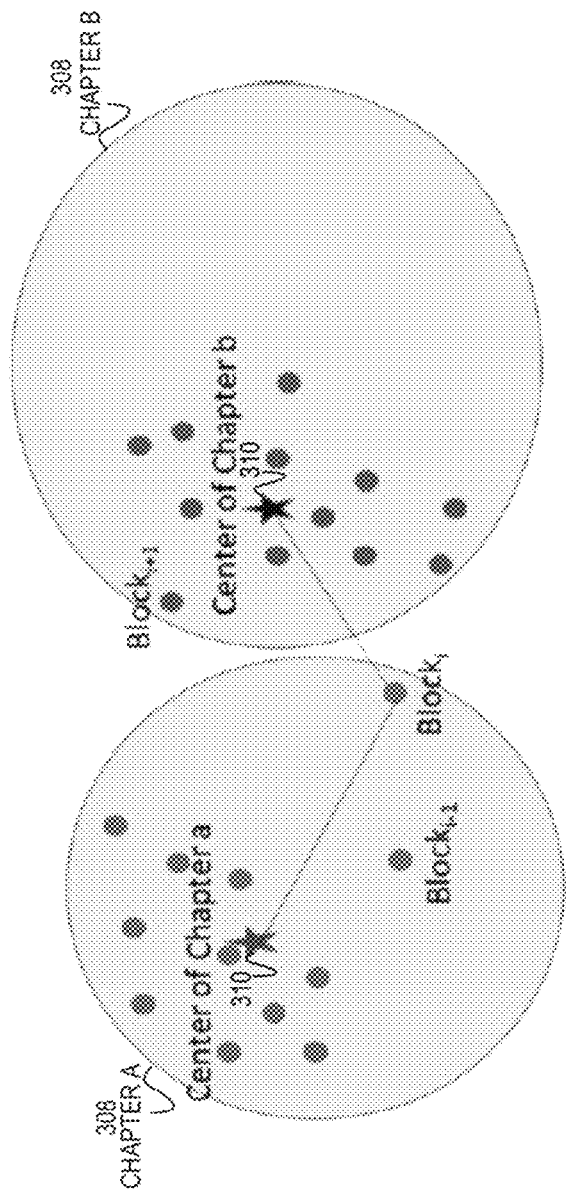
FIG. 3B is a diagram of an example visualization of a similarity between a region and a central mean value of a chapter in which the region belongs and an adjacent chapter.

FIG. 3B is a diagram of a visualization of similarity between a region 304 ($Region_i$) and a central mean value of a chapter 308 in which the region 304 belongs to (Chapter A) and an adjacent chapter (Chapter B). FIG. 3B represents the situation where the content within the region 304 is more closely related to the adjacent chapter 308 (Chapter B) than the chapter in which it is situated (Chapter A). Thus, in this situation, the second breakpoint 306 as in FIG. 3A would be adjusted or modified.

Moving the region 304 closer to the adjacent chapter 308 (Chapter B), means the similarity of that region 304 to the adjacent chapter 308 could increase or decrease accordingly. Additionally, moving the region 304 into the adjacent chapter 308 means the adjacent chapter 308 gains an additional region 304 while the original chapter (Chapter A) loses this region 304 of content. As such, equation 1 may be used to measure the function change of similarity between the region 304 and the chapters 308. In equation 1, $C_{old}$ is the chapter in which the region 304 was originally part of (Chapter A) and $C_{new}$ is the chapter (Chapter B) in which to move region 304.

$$\Delta f_1 = sim(R_i, C_{new}) - sim(R_i, C_{old}) \qquad \text{Equation (1)}$$

The following equation 2 is used to measure a change of the correlation of the moved region 304 and the region adjacent to the second breaking point 306. In equation 2, $R_x$ is the adjacent region of content to the region 304 ($R_i$) across the initial second breakpoint 306 prior to the combination of the region 304 into the adjacent chapter 308 (Chapter B) and $R_y$ is the adjacent region of content to the region 304 across the adjusted second breakpoint 306 after the adjustment of the region 304 into the adjacent chapter 308 (Chapter B).

$$\Delta f_2 = corr(R_i, R_y) - corr(R_i, R_x) \qquad \text{Equation (2)}$$

The results from these equations are combined with different weights $\theta_1$ and $\theta_2$ wherein $\Delta f$ is the overall benefit as in equation 3.

$$\Delta f = (\theta_1 \Delta f_1) - (\theta_2 \Delta f_2) \qquad \text{Equation (3)}$$

In FIG. 3B, each of the multiple regions 304 located near each of the breaking points 306 determine the adjusted correlation value for selecting whether to move the multiple region 304 into the adjacent chapter. For each of the multiple regions 304 located near each of the breaking points 306, it is verified whether to combine that region 304 into the adjacent chapter based on the overall benefit. Combining that region 304 into the adjacent chapter modifies adjacent breakpoint 306 accordingly.

Figure 4:
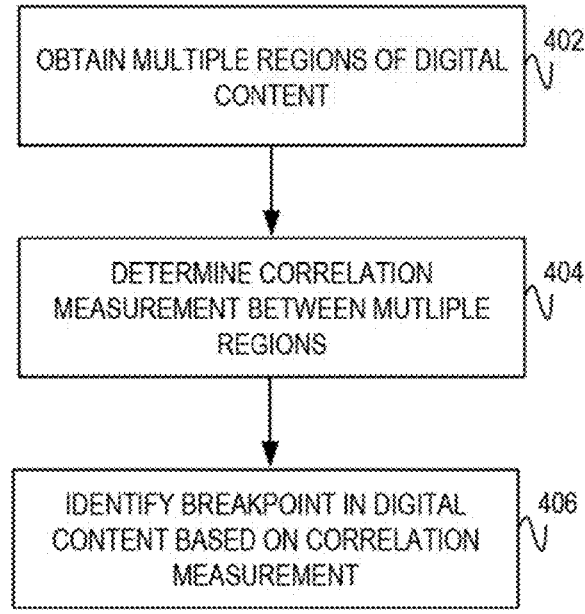
FIG. 4 is a flowchart of an example method to obtain multiple regions of digital content for identifying a breakpoint between the multiple regions of the digital content based on a correlation measurement.

FIG. 4 is a flowchart of an example method, executable by a computing device, to identify a breakpoint based on a correlation measurement. The computing device obtains multiple regions of content and proceeds to determine the correlation measurement. The correlation measurement is a value which represents the relatedness between regions located adjacent to one another. The computing device uses the correlation measurement to identify the breakpoint in the digital content. The breakpoint represents a place of interruption in the digital content thus creating a division in the digital content. Identifying the breakpoint(s) within the digital content provides a mechanism in which to automate chapters) within the digital content. In discussing FIG. 4, references may be made to the components in FIGS. 1-3B to provide contextual examples. In one implementation of FIG. 4, the system 102 as in FIG. 1 operates on the computing device to perform operations 402-406. In this implementation, the operations 402-406 may operate in the background of the computing device to identify the breakpoint in the digital content. Further, although FIG. 4 is described as implemented by the computing device, it may be executed on other suitable components. For example, FIG. 4 may be implemented by a controller (not illustrated) ands or in combination with the executable instructions on a machine-readable storage medium 704 as in FIG. 7.

At operation 402, the computing device obtains multiple regions of digital content. At operation 402, a user inputs the digital content for the computing device to automate chapter (s) within the digital content. The computing device obtains the digital content when a user, such as an author, uploads content or scans the content which may be convened into a machine-readable language for processing. For example, the digital content may include a book under creation composed of multiple pieces of digital content, each piece of content may be considered a region of digital content, such as a page, paragraph, etc. Accordingly, the author generates these pieces of content and links the pieces of content together for input to create the book. In turn, the computing device may obtain this content which may have been previously segmented into multiple regions of digital content or the computing device segments the digital content into the multiple regions. Each of the regions may be semi-related in content, thus the computing device measures which regions of content may be more related than other regions of content. As such, the computing device determines the correlation measurement of the regions of content which are sequentially located adjacent to each other. In another implementation upon uploading the digital content, the user may input a number of breakpoints in which the user wishes to divide the digital content. Segmenting the digital content into the multiple regions, enables the computing device to more accurately identify the breakpoint(s) for segmenting the digital content into chapter(s) as opposed to using a full document of digital content.

At operation 404, the computing device determines the correlation measurement between a pair of multiple regions which are located adjacent to one another. The multiple regions are obtained in the order according to how these regions were input as at operation 402. The correlation measurement is a value obtained of relatedness between regions which are located adjacently to each other. The locations of the regions are sequenced according to how the user inputs the content. For example, the user may create a book about a zoo and as such upload pieces of content in a sequential order such as monkey, zoo, bears, fish, etc. Thus, the correlation measurement may be obtained between: monkey and zoo; zoo and bears; bears and fish. In implementations, the correlation measurement is obtained by means of a correlation function including, by way of example, a Pearson correlation, topic, model, BM25etc.

At operation 406, the computing device identifies the breakpoint in the digital content based on the correlation measurement at operation 404. The breakpoint is located between multiple regions of the digital content. The breakpoint breaks the digital content into multiple chapters, thus the regions of digital content may be grouped together to create the various chapters within the digital content. The order the multiple regions grouped together is maintained according to the order of the digital content is input. In one implementation, if the correlation measurement is below a particular threshold indicates there should be a break within the digital content. In another implementation, the computing device determines multiple correlation measurement values, each correlation measurement corresponds to a different pair of multiple regions located adjacent to each other. In this implementation, the correlation measurement values are ranked according to the lower ranked values. The lower ranked values indicate less relatedness between the regions and thus the breakpoint. In another implementation, the breakpoint serves as initial breakpoint which may be adjusted. This implementation is discussed in detail in later figures.

Figure 5:
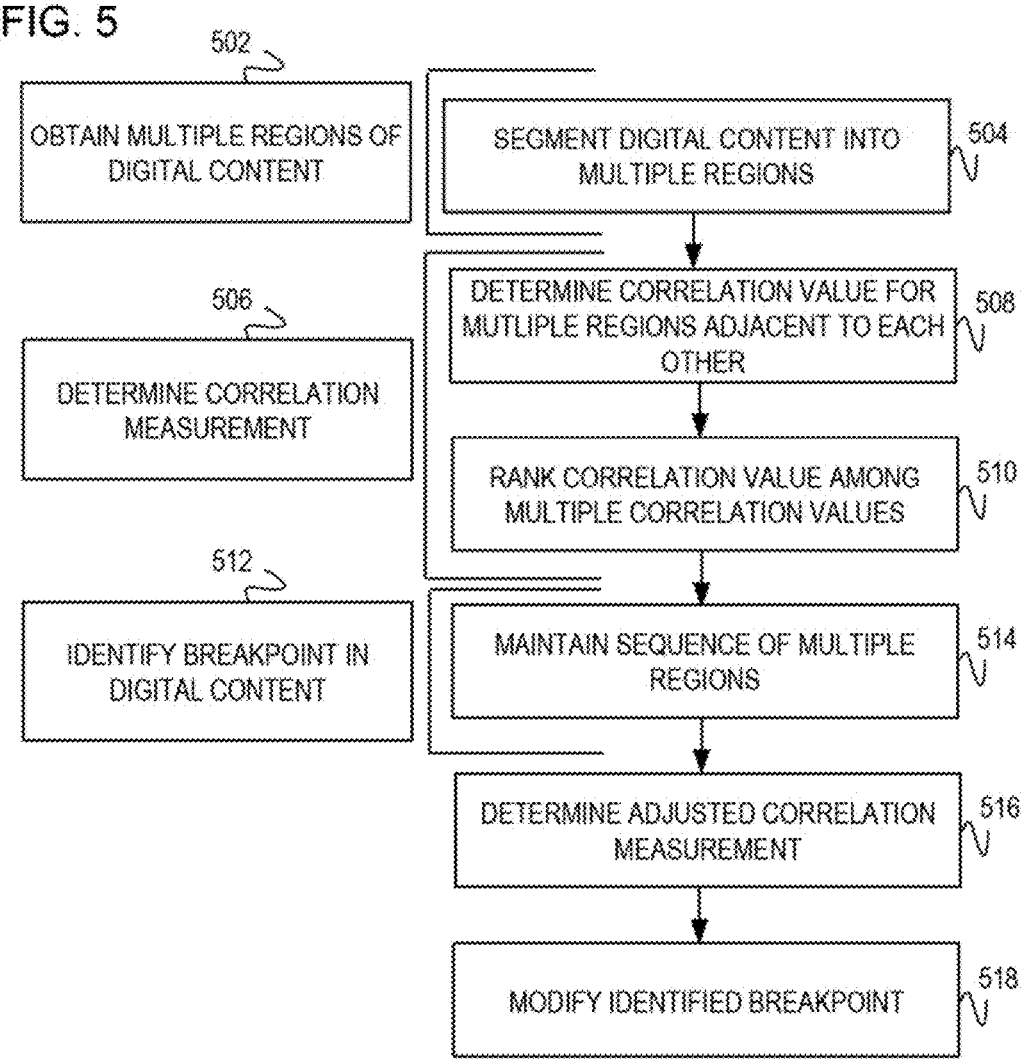
FIG. 5 is a flowchart of an example method to modify an identified breakpoint in digital content based on an adjusted correlation measurement.

FIG. 5 is a flowchart of an example method, executable by a computing device, to modify an identified breakpoint in digital content based on an adjusted correlation measurement. The computing device obtains digital content and segments the content into multiple regions. A correlation value is determined for each pair of multiple regions located adjacently to each other. These correlation values are ranked to determine which correlation values indicate there should be a breakpoint in the digital content. Ranking the correlation values, the computing device identifies the initial breakpoint in the digital content. Upon identifying the initial breakpoint, the computing device obtains a different correlation value for each of the multiple regions located adjacent to the initial breakpoint. The computing device may proceed to modify the initial breakpoint based on the different or adjusted correlation values. In discussing FIG. 5, references may be made to the components in FIGS. 1-3B to provide contextual examples. In one implementation of FIG. 5, the system 102 as in FIG. 1 operates on the computing device to perform operations 502-518. In this implementation, the operations 502-518 may operate in the background of the computing device to identify the breakpoint in the digital content. Further, although FIG. 5 is described as implemented by the computing device, it may be executed on other suitable components. For example, FIG. 5 may be implemented by a controller (not illustrated) and/or in combination with the executable instructions on a machine-readable storage medium 704 as in FIG. 7.

At operation 502, the computing device obtains the multiple regions of digital content. In one implementation, a user inputs a document of digital content which the computing device segments into the multiple regions as at operation 504. Operation 502 may be similar in functionality to operation 402 as in FIG. 4.

At operation 504, the computing device segments the digital content into the multiple regions. Upon obtaining the digital content at operation 502, the computing device may segment this content into regions or sections. At operation 504, the digital content is broken into subsections or regions of the digital content for processing. Segmenting the digital content into the multiple regions enables the computing device to determine the correlation measurement between those pairs of regions which are adjacent to one another at operations 506-510.

At operation 506, the computing device determines the correlation measurement between those pairs of multiple regions which are adjacent to each other. The correlation measurement is used to determine how related the adjacent multiple regions are to one another. The more related indicates to the computing device those multiple regions should be located within the same chapter. The less related indicates to the computing device to insert a breakpoint between those multiple regions, thus creating the chapters. In one implementation, the computing device proceeds to operations 508-510 to determine the correlation measurement. Operation 506 may be similar in functionality to operation 404 as in FIG. 4.

At operation 508, the computing device determines the correlation value for each pair of multiple regions located adjacent to one another. Each correlation value corresponds to a different pair of multiple regions, thus producing multiple correlation values the computing device may proceed to rank at operation 510.

At operation 510, the computing device ranks each of the correlation values obtained for each pair of multiple regions adjacently located by each other. In one implementation, the correlation values are ranked in accordance to those values which are below a particular threshold. In another implementation, the correlation values are ranked in ascending to descending order. In these implementations, the lower the amount of the correlation value indicates the less related content is between the adjacent regions. This lesser relatedness between the adjacent regions of content indicates to the computing device there should be a breakpoint between those adjacent regions of content.

At operation 512, the computing device identifies the breakpoint in the digital content. In one implementation, the computing device identifies a number of breakpoints according to a predefined number of chapters and/or a predefined number of breakpoints. In this implementation, the number of chapters and/or the number of breakpoints may be user-defined. Additionally, using the correlation values indicates the measure of how related the pair of multiple regions are to one another enabling the computing device to identify the breakpoints. Operation 512 may be similar in functionality to operation 406 as in FIG. 4.

At operation 514, the computing device maintains the sequence of the multiple regions in accordance with the order or sequence in which the digital content was uploaded.

At operation 516, the computing device determines the adjusted correlation measurement upon the identification of the breakpoint at operation 512. The adjusted correlation measurement is a value of relatedness for each multiple region adjacent to the identified breakpoint. The value of relatedness indicates whether to combine the region to the adjacent chapter or section or to leave the multiple region as part of the initial chapter. Based on this value, the computing device may modify the breakpoint at operation 518.

At operation 518, the computing device modifies the identified breakpoint based on the adjusted correlation measurement at operation 516. In this implementation, if the adjusted correlation measurement indicates a higher relatedness between the content region and the content adjacent chapter, the region is merged into the adjacent chapter as part of that chapter. Merging or combining the particular region into the adjacent chapter adjusts the adjacent chapter to include that particular region. This modifies the identified breakpoint to increase the content in that adjacent chapter.

Figure 6:
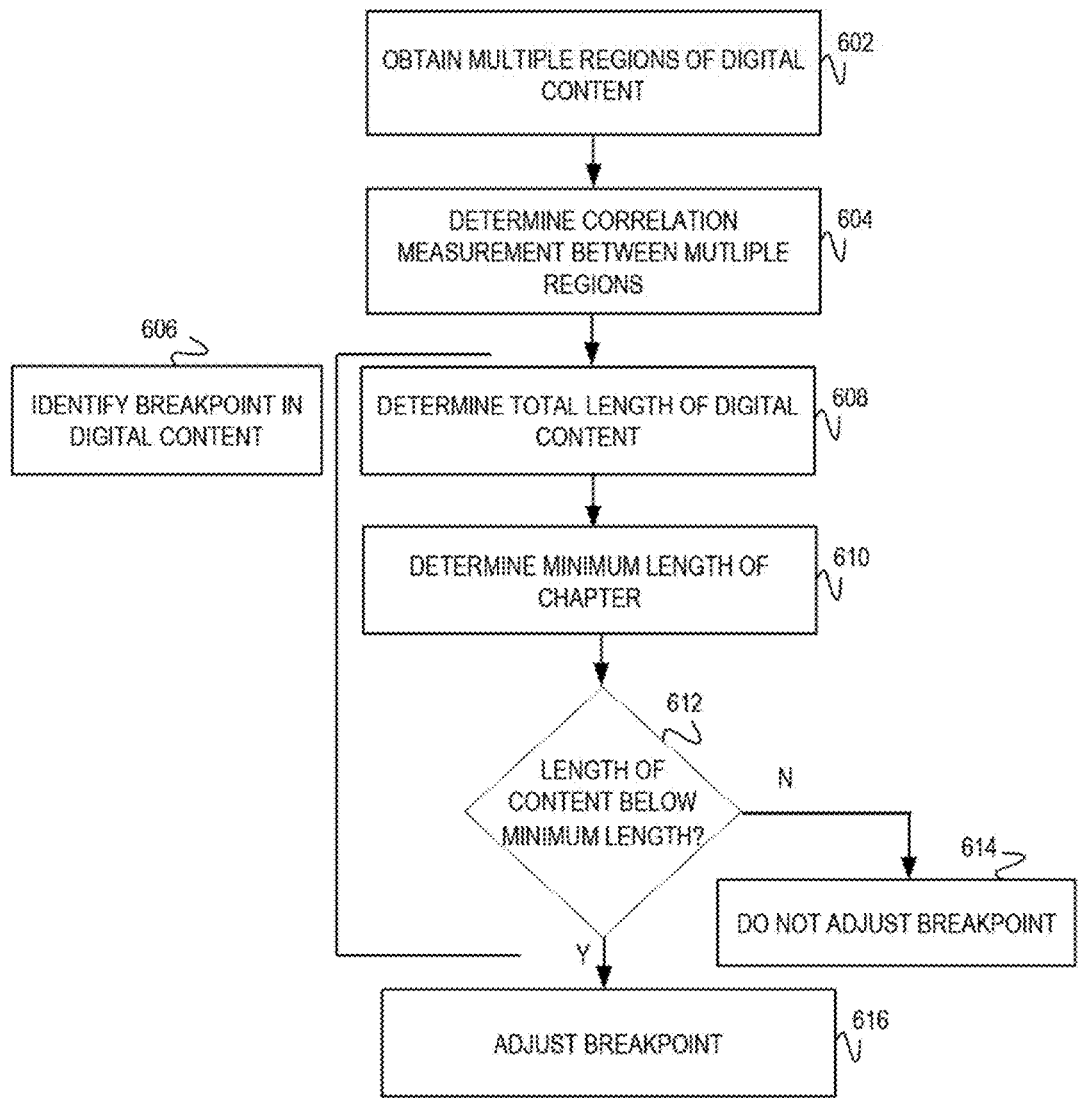
FIG. 6 is a flowchart of an example method to adjust a breakpoint if a length of content is below a determined minimum length of content.

FIG. 6 is a flowchart of a method, executable by a computing device, to adjust a breakpoint if a length of content is below a determined minimum length of content. The computing device obtains multiple regions of digital content and determines a correlation value between those pairs of multiple regions which are located adjacent to one another. Upon determining the correlation value for the adjacent multiple regions, the computing device identifies the breakpoint as an initial breakpoint within the digital content. The breakpoint is considered an interruption between the regions of content so the most relevant content is grouped together within a chapter and/or section. As illustrated in FIG. 6, the computing device may proceed to determine a total length of digital content and thus may determine a minimum length of content which should be included in the chapter. Upon determining the minimum length, the computing device may identify whether the chapter created by the identified breakpoint is below the minimum length. If the computing device determines the chapter is below the minimum length of content, the computing device may proceed to combine the chapter in the adjacent chapter. Combining these chapters adjusts or modifies the breakpoint so the interruption in the digital may occur earlier or later. In discussing FIG. 6, references may be made to the components in FIGS. 1-3B to provide contextual examples. In one implementation of FIG. 6, the system 102 as in FIG. 1 operates on the computing device to perform operations 602-616. In this implementation, the operations 602-616 may operate in the background of the computing device to identify the breakpoint in the digital content. Further, although FIG. 6 is described as implemented by the computing device, it may be executed on other suitable components. For example, FIG. 6 may be implemented by a controller (not illustrated) and/or in combination with the executable instructions on a machine-readable storage medium 704 as in FIG. 7.

At operation 602, the computing device may obtain the multiple regions of digital content. Operation 602 may be similar in functionality to operations 402 and 502 as in FIGS. 4-5.

At operation 604, the computing device determines the correlation measurement between the pair(s) of those multiple regions which are located adjacent to one another in the digital content. Operation 604 may be similar in functionality to operations 404 and 506 as in FIGS. 4-5.

At operation 606, the computing device identifies the initial breakpoint in the digital content. Operation 606 may be similar in functionality to operations 406 and 512 as in FIGS. 4-5.

At operation 608, the computing device determines the total length of the digital content which was obtained at operation 602. The total length of the digital content is used to determine the minimum length of content in each chapter.

At operation 610, the computing device determines the minimum length of content which should be included in each chapter. Determining the minimum length ensures the chapters are not excessively small in content.

At operation 612, the computing device determines the actual length or amount of content included in the chapter which is adjacent to the initial breakpoint. If the length of content is below the minimum amount of content, the computing device combines the chapter into the adjacent chapter thus adjusting the breakpoint at operation 616. If the computing device determines the length of the chapter is not below the minimum amount of content, the computing device proceeds to operation 614 and does not adjust the breakpoint.

At operation 614, upon the determination the actual length of the content in the chapter is not below the minimum length identified at operation 610, the computing device does not adjust the breakpoint. Alternatively, upon the determination the actual length of content is equal to or above the minimum content length, the computing device may keep the initial breakpoint identified at operation 606 as the breakpoint for separating the digital content.

At operation 616, upon the determination the chapter is below the minimum length of content, the computing device may adjust the breakpoint to combine that chapter into the neighboring chapter. Merging the chapter into the adjacent chapter also modifies the breakpoint so the breakpoint comes earlier or later in the digital content.

FIG. 7 is a block diagram of computing device 700 with a processor 702 to execute instructions 706-724 within a machine-readable storage medium 704. Specifically, the computing device 700 with the processor 702 modifies an identified breakpoint based on a correlation value and a similarity value. Although the computing device 700 includes processor 702 and machine-readable storage medium 704, it may also include other components that would be suitable to one skilled in the art. For example, the computing device 700 may include an engine 102 in FIG. 1. The computing device 700 is an electronic device with the processor 702 capable of executing instructions 706-724, and as such embodiments of the computing device 700 include a computing device, mobile device, client device, personal computer, desktop computer, laptop, tablet, video game console, or other type of electronic device capable of executing instructions 706-724. The instructions 706-724 may be implemented as methods, functions, operations, and other processes implemented as machine-readable instructions stored on the storage medium 704, which may be non-transitory, such as hardware storage devices (e.g., random access memory (RAM), read only memory (ROM), erasable programmable ROM, electrically erasable ROM, hard drives, and flash memory).

The processor 702 may fetch, decode, and execute instructions 706-724 to modify the identified breakpoints based on the correlation value and the similarity value. In one implementation, upon executing instructions 706-710, the processor 702 may execute instruction 712 through execution of instruction 714. In another implementation, upon executing instructions 706-714, the processor 702 may proceed to execute instructions 716-722 prior to execution of instruction 724. Specifically, the processor 702 executes instructions 706-714 to: receive digital content in a sequence, such as uploading and/or inputting the digital content; segment the digital content into multiple regions; determine a correlation value for a pair of multiple regions located adjacent to each other; identify an initial breakpoint based on the correlation value; and rank the correlation value among multiple correlation values, each correlation value corresponds to a different pair of multiple regions located in an adjacent manner to one another. The processor 702 may execute proceed to execute instructions 716-724 to: determine an adjusted correlation value for each of the multiple regions adjacent to the breakpoint; determine a similarity value by obtaining a central mean value of the digital content included in a chapter or section and determining if a distance of the region neighboring the breakpoint is closer to the central mean value in the chapter in which it belongs or a neighboring chapter; and modify the identified breakpoint based on the adjusted correlation value and the similarity value.

The machine-readable storage medium 704 includes instructions 706-724 for the processor 702 to fetch, decode, and execute. In another embodiment, the machine-readable storage medium 704 may be an electronic, magnetic, optical, memory, storage, flash-drive, or other physical device that contains or stores executable instructions. Thus, the machine-readable storage medium 704 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 704 may include an application and/or firmware which can be utilized independently and/or in conjunction with the processor 702 to fetch, decode, and/or execute instructions of the machine-readable storage medium 704. The application and/or firmware may be stored on the machine-readable storage medium 704 and/or stored on another location of the computing device 700.

We claim:

1. A system comprising:
   a processing engine to obtain a sequence of multiple regions of digital content;
   a correlation engine to determine a correlation value between a first region and a second region of the multiple regions of digital content adjacently located to each other;
   an identification engine to:
     identify a breakpoint between the first region and the second region based on the correlation value, wherein a first section that includes the first region and a second section that includes the second region are created based on identifying the breakpoint between the first region and the second region; and maintain the sequence of the multiple regions of digital content upon identification of the breakpoint; and an adjustment engine to:

determine an adjusted correlation value, wherein the adjusted correlation value is based on a difference of a first correlation of the first region with the second region and a second correlation of the first region with a third region adjacent to the first region in the first section; and adjust the identified breakpoint based on the adjusted correlation value, wherein adjusting the identified breakpoint causes the first region to move to the second section from one side of the identified breakpoint to an opposite side of the identified breakpoint.

2. The system of claim 1 wherein the processing engine is further to:

segment the digital content into the multiple regions; and remove stop and stemming content from each of the multiple regions of digital content.

3. A method of creating a breakpoint in digital content, the method comprising:

obtaining multiple regions of digital content;

determining a correlation measurement between a first region and a second region of the multiple regions of digital content adjacently located to each other;

identifying a breakpoint in the digital content between the first region and the second region based on the determined correlation measurement, wherein a first section that includes the first region and a second section that includes the second region are created based on identifying the breakpoint between the first region and the second region;

determining an adjusted correlation measurement, wherein the adjusted correlation measurement is based on a difference of a first correlation of the first region with the second region and a second correlation of the first region with a third region adjacent to the first region in the first section; and modifying the breakpoint based on the adjusted correlation measurement, wherein modifying the breakpoint causes the first region to move to the second section from one side of the identified breakpoint to an opposite side of the identified breakpoint.

4. The method of claim 3 wherein the second section includes a set of the multiple regions of digital content.

5. The method of claim 3, further comprising ranking the correlation measurement among multiple correlation measurements to identify the breakpoint in the digital content.

6. The method of claim 3 wherein obtaining the multiple regions of digital content includes:

segmenting the digital content into at least one of pages, paragraphs, and sentences to produce the multiple regions.

7. The method of claim 3 wherein identifying the breakpoint in the digital content based on the determined correlation measurement comprises:

determining a total length of the digital content;

determining a minimum length of content adjacent to the breakpoint based on the total length of the digital content;

determining if a length of the content adjacent to the breakpoint is below the minimum length of content; and adjusting the breakpoint upon the determination that the length of the content adjacent to the breakpoint is below the minimum length of content.

8. The method of claim 3 wherein identifying the breakpoint in the digital content based on the correlation measurement comprises:

maintaining a sequence of the multiple regions of digital content upon identification of the breakpoint.

9. A non-transitory machine-readable storage medium comprising instructions that when executed by a processor cause a computing device to:

receive digital content in a sequence;

segment the digital content into multiple regions;

determine a correlation value for a first region and a second region located adjacent to each other;

identify a breakpoint between the first region and the second region based on the correlation value, wherein a first section that includes the first region and a second section that includes the second region are created based on identifying the breakpoint between the first region and the second region;

determine an adjusted correlation value, wherein the adjusted correlation value is based on a difference of a first correlation of the first region with the second region and a second correlation of the first region with a third region adjacent to the first region in the first section; and modify the identified breakpoint based on the adjusted correlation value, wherein adjusting the identified breakpoint causes the first region to move to the second section.

10. The non-transitory machine-readable storage medium of claim 9 wherein to identify the breakpoint based on the correlation value comprises instructions that when executed by the processor cause the computing device to:

rank the correlation value among multiple correlation values to identify the breakpoint, wherein each of the multiple correlation values correspond to a different pair of adjacent multiple regions.

11. The non-transitory machine-readable storage medium of claim 9, wherein to modify the identified breakpoint comprises instructions that when executed by the processor causes the computing device to:

obtain a central mean value of digital content between breakpoints; and determine if a distance of each of the first region and the second region adjacent to the identified breakpoint is closer to the central mean value of the digital content between breakpoints.

12. The non-transitory machine-readable storage medium of claim 9 comprising instructions that when executed by the processor causes the computing device to:

determine a length of the digital content;

determine a minimum length of digital content adjacent to the breakpoint based on a total length of the digital content;

determine if a length of the digital content adjacent to the breakpoint is below the minimum length of digital content; and adjust the breakpoint upon the determination the length of the digital content adjacent to the breakpoint is below the minimum length of content.

* * * * *

UNITED STATES PATENT AND TRADEMARK OFFICE
CERTIFICATE OF CORRECTION

PATENT NO. : 10,353,987 B2  
APPLICATION NO. : 15/545681  
DATED : July 16, 2019  
INVENTOR(S) : Shanchan Wu et al.

Page 1 of 1

It is certified that error appears in the above-identified patent and that said Letters Patent is hereby corrected as shown below:

On the Title Page

In Column 2, in item (57), abstract, Line 1, before "regions" insert -- multiple --.

Signed and Sealed this  
Twenty-fourth Day of December, 2019

Andrei Iancu  
*Director of the United States Patent and Trademark Office*